March 29, 1938. W. C. McNITT 2,112,784
METHOD OF NONAERATING COOKING AND APPARATUS THEREFOR
Original Filed April 27, 1931 7 Sheets-Sheet 1

Inventor
Willard C. McNitt
By Harry H. Hitzeman
His Attorney

March 29, 1938. W. C. McNITT 2,112,784
METHOD OF NONAERATING COOKING AND APPARATUS THEREFOR
Original Filed April 27, 1931 7 Sheets-Sheet 2

Inventor
Willard C. McNitt
By Harry H. Hitzeman
His Attorney

March 29, 1938. W. C. McNITT 2,112,784
METHOD OF NONAERATING COOKING AND APPARATUS THEREFOR
Original Filed April 27, 1931 7 Sheets-Sheet 3

March 29, 1938. W. C. McNITT 2,112,784
METHOD OF NONAERATING COOKING AND APPARATUS THEREFOR
Original Filed April 27, 1931 7 Sheets-Sheet 6

Inventor
Willard C. McNitt
By
Harry H. Hitzeman
His Attorney

Patented Mar. 29, 1938

2,112,784

UNITED STATES PATENT OFFICE 2,112,784

METHOD OF NONAERATING COOKING AND APPARATUS THEREFOR

Willard C. McNitt, Winnetka, Ill.

Application April 27, 1931, Serial No. 533,189
Renewed August 13, 1937

7 Claims. (Cl. 99—105)

My invention relates to a novel process of non-aerating cooking and the apparatus therefor, and relates more particularly to a non-aerating process of cooking tomatoes or similar vegetable or fruit or other food products.

Due to the many advantages and the highly successful results proven by actual experiment, the invention will be thoroughly described with particular reference to treating tomatoes, bearing in mind, however, that the process applies equally well to many other types of fruit and vegetables having similar characteristics, and to food products, generally.

In the preparation of tomato juice for household consumption by any of the methods of the prior art, many difficulties have been encountered in producing a satisfactory tomato juice. In preparing tomato juice and conveying it to the filling machines and containers by one well-known method of the prior art, the product is treated in the following manner:

The first operation in preparing tomatoes or tomato juice is to place the whole tomatoes in an open steam box where a pre-heating treatment is given to them. The tomatoes are then carried, either by hand or by an elevator, to the extractor where they are broken and juice extracted.

The juice is then, either put into containers or placed in jacketed kettles where it is cooked in water or steam which is usually brought to a closing temperature of over 120° F. The juice is sometimes heated from twenty to thirty minutes in order to attain a temperature of 212° F. After the juice is placed into the containers it is processed by being subjected to other heating equipment for another long period.

In handling tomato juice it is a generally recognized fact, that the product should be handled as little and as quickly as possible, consequently speed and efficiency in handling the product is an important factor.

Tomato juice today has become a very important factor in American life, due to its high favor both as an appetizer and as a disease combatant. In extracting and cooking tomato juice in open air kettles, such as those above-mentioned, valuable vitamins, particularly vitamin C, are destroyed from contact with air. Further, in preparing tomatoes for cooking by the process above-mentioned, as soon as the tomatoes are opened, the pectin which is found inside of the pulp in the gummy substance around the seeds, is attacked by the air, and microscopic agencies which are called "enzymes" immediately destroy this pectin unless heat is applied at a temperature of 150° F. or more, which will normally cause a sort of steam enveloping cloud, thereby protecting the tomatoes from the air. It has been found by careful investigation and through experiment that if heat is applied to tomatoes, with the air excluded, these "enzymes" are rendered inactive and the pectin is saved for the juice or other product.

In an attempt to accomplish this end another unsatisfactory method of the prior art contemplates the preparing of tomatoes by a cooking process where the tomatoes are conducted into a tube where paddles grind up the tomatoes in a continuous atmosphere of live steam. The theory of this method is that the live steam successfully defends the pectin in the tomato against the actions of the "enzymes". However, there are several serious objections to the above-mentioned method. The principal objection is the fact that the cutting and cooking of the tomatoes in an atmosphere of live steam causes adulteration. This objection is doubly serious due to the fact that it trespasses the pure food laws. The other objection to this method is that when live steam strikes the tomatoes it carries with it a certain percentage of the tomato flavor and fumes. As a result the finished product naturally lacks the genuine complete tomato flavor which is highly desirable in the product.

It is an object of the present invention to produce tomato juice for the market by a new process wherein all of the objections above enumerated are overcome. My invention contemplates the cooking and conveying of the tomato juice to the extractor from which it is placed into containers by an improved method wherein air or steam is not brought into contact with the tomatoes after the time they are cut and conveyed into the heating apparatus.

A further object of the present invention is to provide an improved process for cooking tomatoes, by the use of which all of the tomato flavor and fumes will be retained in the finished product.

A further object of the present invention is to produce tomato juice by an improved process whereby the complete flavor will be retained and the vitamins, particularly vitamin C, which is ordinarily destroyed when the tomatoes are heated, will not be destroyed but rather, will be incorporated in the finished product. In this manner the tomato juice will not only be a food product of a much greater food value, since vitamin C in tomato juice is absolutely necessary for the treatment of many well-known diseases, but the flavor, body consistency and appearance will greatly enhance the salability thereof.

In carrying out my invention, I contemplate the provision of improved apparatus whereby the tomatoes will be placed upon conveyors and be pre-heated as they are being carried to a cutter or chopper located above the heating chamber and from which the chopped up tomatoes will instantly drop into and through an ordinary sink trap into the heating chambers where they will be thoroughly cooked without being exposed to the air.

A further feature of the apparatus lies in the fact that the tomatoes will be heated to an even temperature while traveling through the cooking chamber by dry heat inducted through the walls of the chamber.

A further feature of the apparatus resides in the new and improved means for heating the tomatoes while they are continuously traveling.

A further feature of the apparatus resides in the fact that heat is applied both from the outside and from the inside against the body of the material traveling through the cooking chamber so that every part thereof will be uniformly heated throughout.

A further feature of the apparatus resides in the new and improved means whereby the tomatoes are quickly and effectively heated while they are continuously travelling.

A further feature of the apparatus is the provision of a trapped inlet and outlet into and out of the cooking chamber whereby air is positively excluded from the chamber.

A further feature of the apparatus is the location and construction of my improved cutting mechanism positioned so that material passing through falls by gravity into the upper trap above the cooking chamber.

A further feature of the apparatus resides in the specific construction of the steam inlet and outlet means and the arrangement whereby the condensation thereof is carried off.

Other features and advantages will be more clearly understood as the description progresses, reference being had to the accompanying drawings, in which.

The machine consists of a plurality of connected units comprising generally a conveyor or elevating mechanism A, a cutting box B, a heating chamber C and a juice extractor D, all connected together and forming a continuous mechanism. This mechanism is so arranged for the purpose of providing a continuous passage of material and also for grouping the operating elements so that a minimum of floor space will be required.

Figure 1:
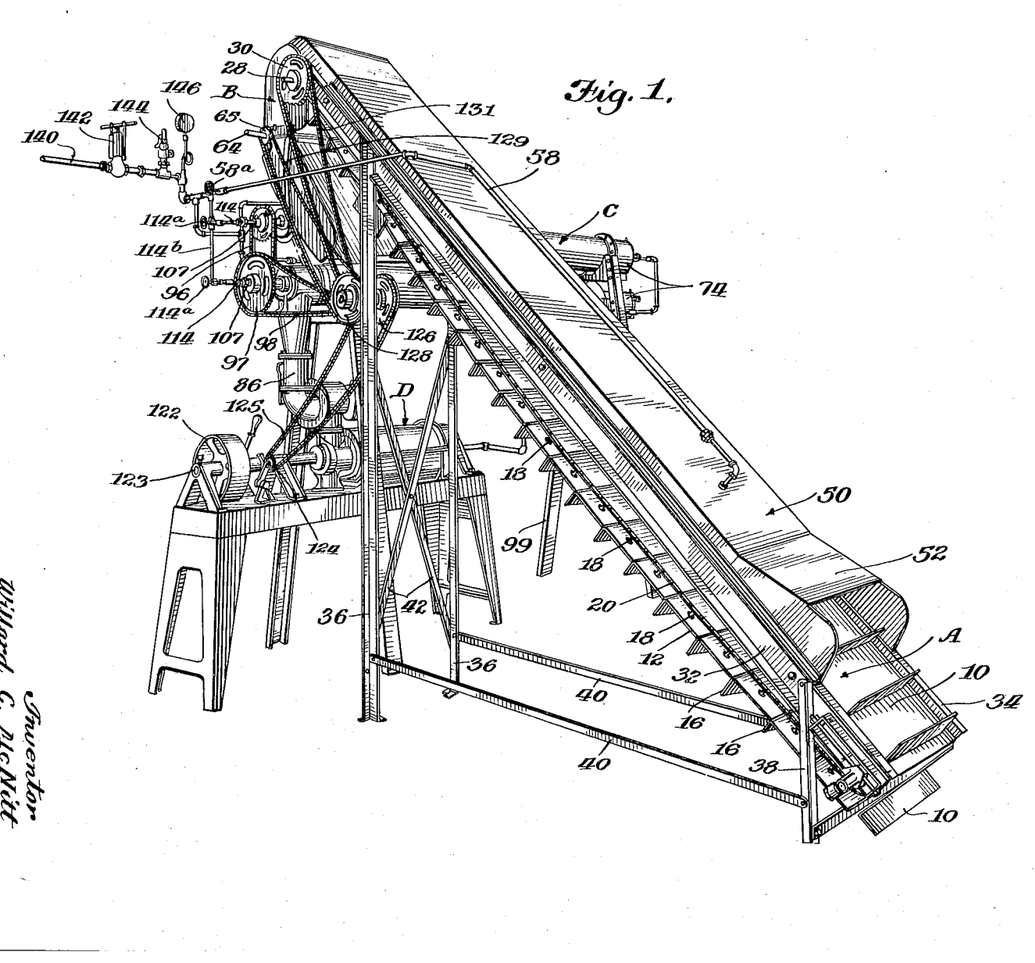
Fig. 1 is a view of the machine in perspective, looking from a point adjacent the front end of the conveyor.
Figure 2:
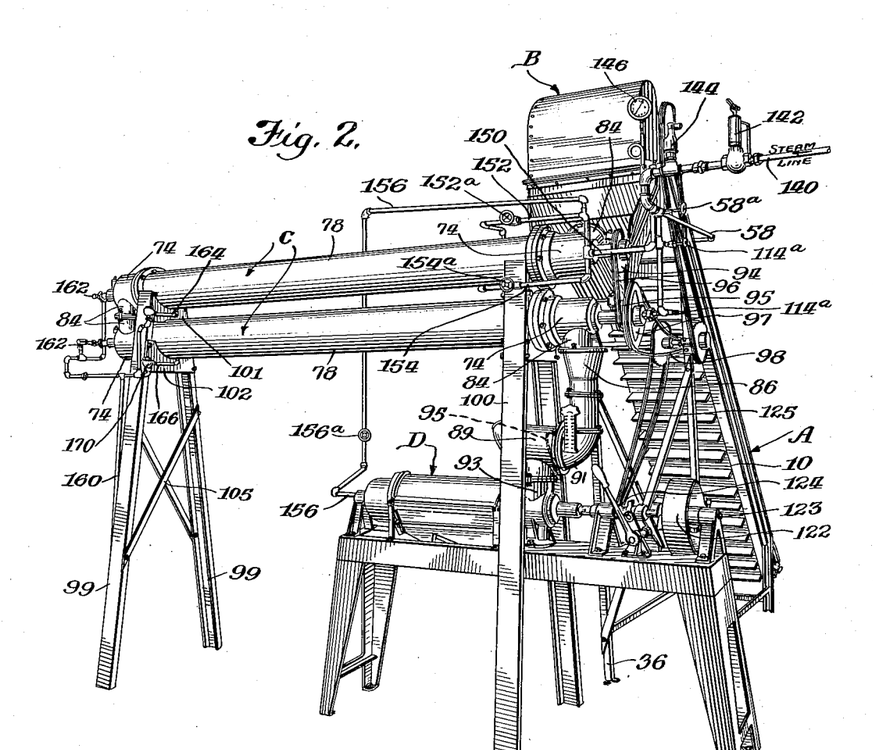
Fig. 2 is a view in perspective, looking from the rear of the machine and illustrating generally the connection between the conveyor and the heating chamber.

The material elevating mechanism which will first be described comprises a conveyor 10 (Figs. 1, 3 and 4) consisting of an endless chain formed of a plurality of L-shaped plates 12. The plates 12, formed with a bottom wall 14 and an upright wall 16, are secured to links 18 of endless chains 20 that are geared to suitable sprockets 22 at the bottom of the conveyor and similar sprockets 24 at the top of the conveyor. Sprockets 22 and 24 are mounted and locked upon suitable shafts 26 and 28. A driving sprocket 30 is keyed to shaft 28 at one end thereof for providing means for driving the conveyor chain.

Figure 4:
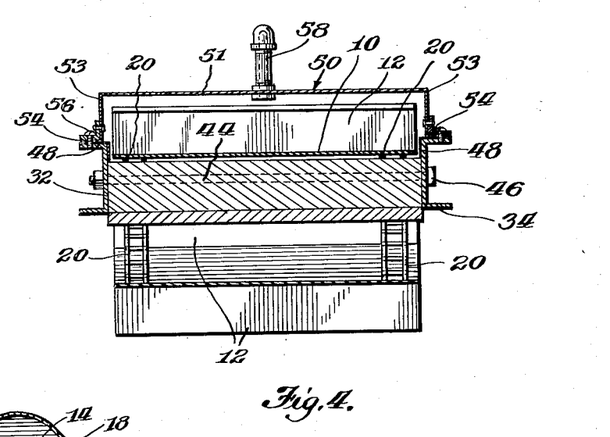
Fig. 4 is a cross-sectional view through the conveyor, taken generally on the line 4—4 of Fig. 3.

Shafts 26 and 28 are supported in suitable bearings in a framework consisting of a pair of spaced outwardly facing channel members 32 and 34. The channel members are held at an angle of substantially 45° upon legs 36 and 38. The legs are braced by suitable horizontal straps 40 and diagonal cross-straps 42.

Channel members 32 and 34 are spaced apart sufficiently to allow the conveyor chain to travel between them. A flooring 44 which may be constructed of wood extends from adjacent lower shaft 26 to a point adjacent upper shaft 28 and provides a support for the conveyor chain. This flooring is secured in position between the channel members by a plurality of cross bolts 46.

To protect the material from contact with the channel members a pair of angle-shaped strips 48 of non-corrosive metal are provided overlying the upper exposed sides of the channel members.

Figure 3:
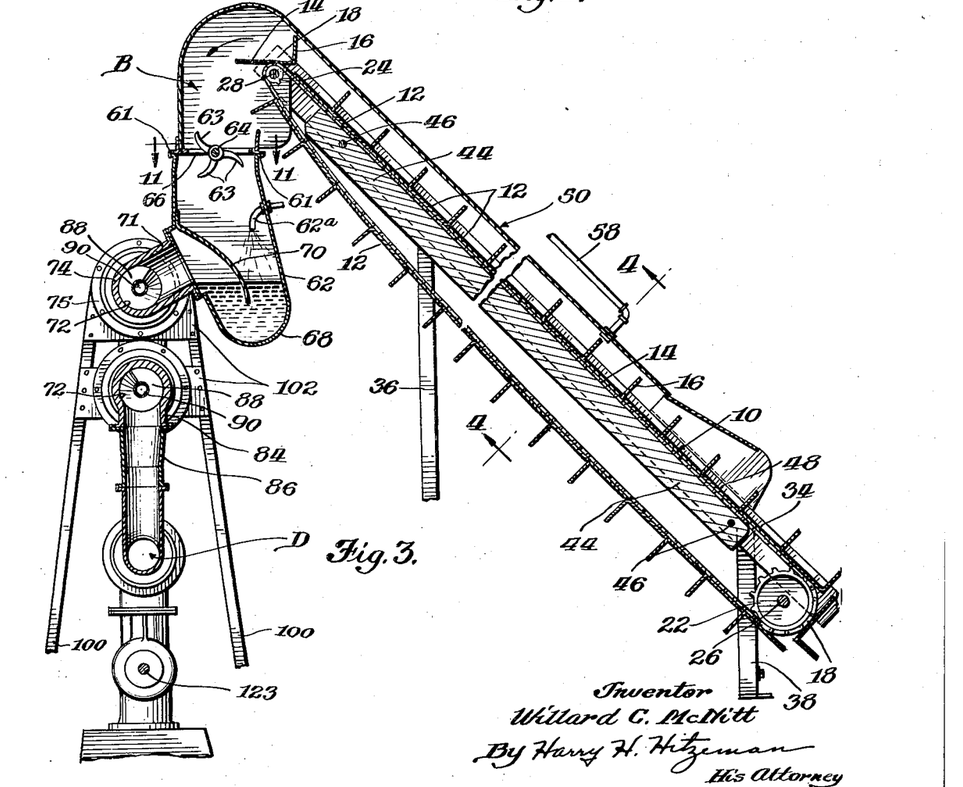
Fig. 3 is a vertical sectional view through the conveying mechanism and portions of the heating chambers and extractor unit.

From a point shortly above the lower end of the conveyor which, of course, is the receiving end, I prefer to enclose the conveyor so that live steam may be poured upon the material upon the conveyor. Accordingly I provide an enclosure 50 formed of stainless metal and having an enlarged open-mouthed end 52. The enclosure 50 may have upper walls 51 and side walls 53 which have laterally projecting flanges 54. Angle strips 55 are riveted to wall 53 and the enclosure 50 is secured to the tops of channel members 32 and 34 by suitable screw members 56 which extend through angle strips 55 and screw-threadedly engage in the upper flanges of members 32.

A pipe-line 58 extending from a source of live steam of a desired pressure is secured to enclosure 50 at a point adjacent its lower end.

The upper end of enclosure 50 is continued to and formed integral with the cutting box B. This is very important because it is essential that the steam rising in the enclosure be closed therein to heat the material continuously during its movement up to the cutting box. The steam also serves to heat the cutting box which is highly desirable.

Figures 9, 11:
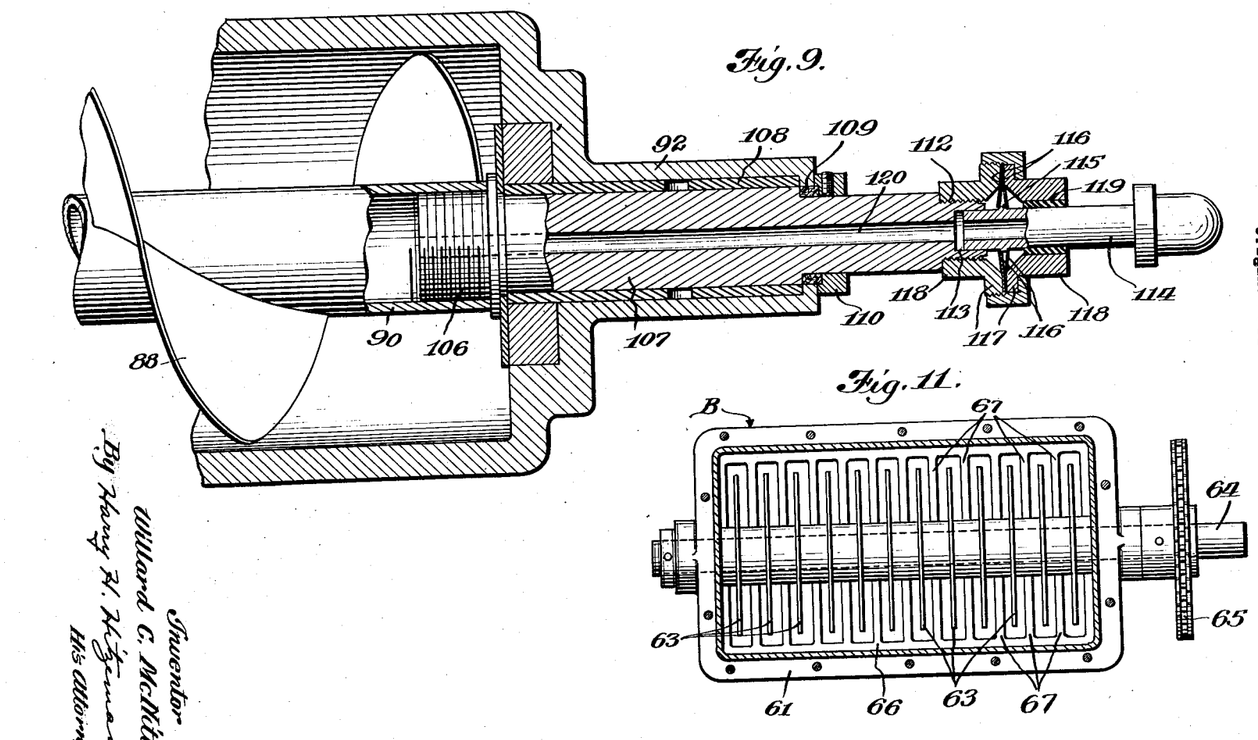
Fig. 9 is an enlarged fragmentary sectional view through one of the steam inlets to the interior of the spiral conveyors and is taken generally on the line 9—9 of Fig. 6.
Fig. 11 is an enlarged plan sectional view through the cutting box, illustrating the cutting knives and their associated grate.

The cutting box B may be formed of two sections, an upper unit 60 and a lower unit 62, suitably fastened together at their meeting flanges 61. A cutting mechanism is also positioned at this point and comprises a plurality of knives 63 mounted for rotary movement upon a drive shaft 64. Drive shaft 64 is mounted in suitable bearings provided in lower unit 62 and has a sprocket wheel 65 keyed thereto at one end. A grate shaped rectangular frame 66 is supported directly below the knife-shaft and has a plurality of cross-bars 67 which lie between the knives.

By this construction a uniform cut is assured and all the pieces will be of a more or less uniform size.

Figure 5:
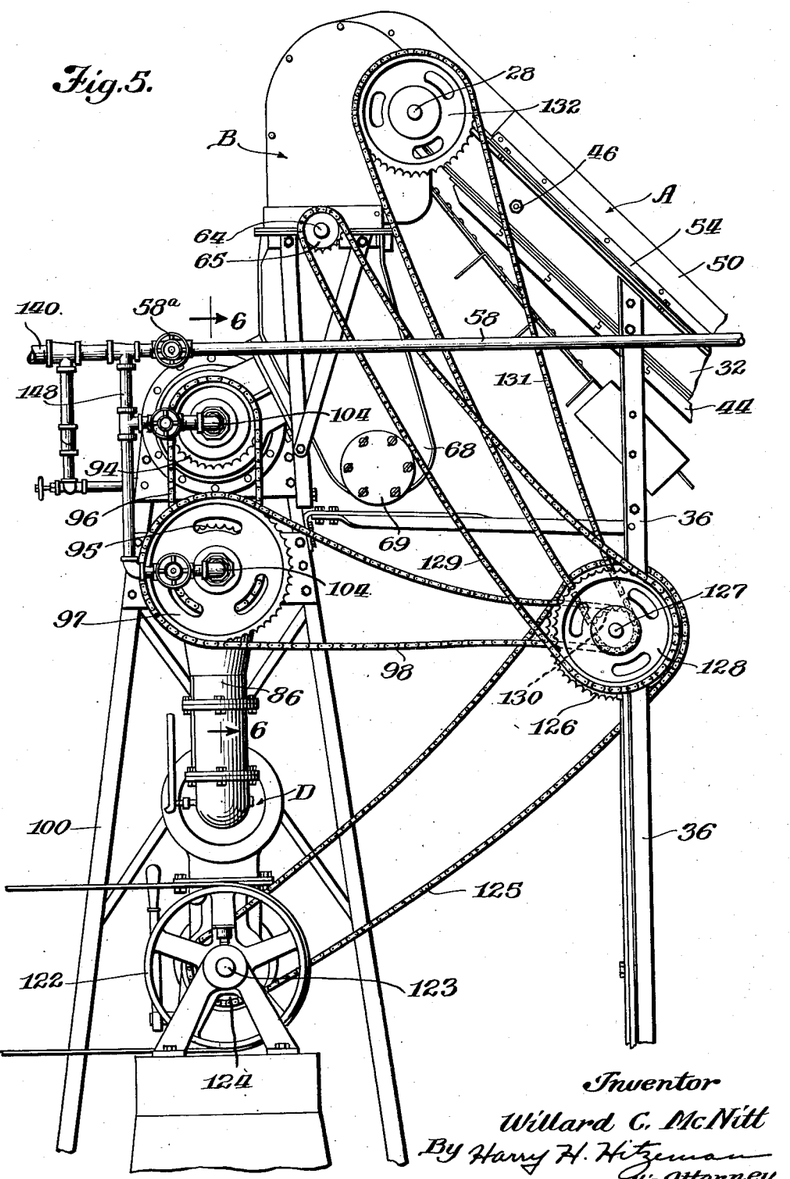
Fig. 5 is an enlarged fragmentary end elevational view of the machine, illustrating the various driving connections.

The lower unit 62 depends from flanges 61 and forms in effect a sink trap 68 into which the cut up materials are adapted to drop from the cutting mechanism. As shown in Fig. 5, a clean-out door 69 is provided on one side thereof. A baffle-plate 70 which is secured to one wall of the box B extends downwardly to a point adjacent the lower end of trap 68 overlying inlet 71 into the heating chambers.

The heating chamber C may be in the form of a longitudinal conduit 72 provided at each end with a head member 74. As clearly shown in Fig. 3, the head member 74 at one end is secured to the cutting box B through suitable flanges and fastening means. It is, of course, understood that wherever necessary suitable packings are provided.

Figure 6:
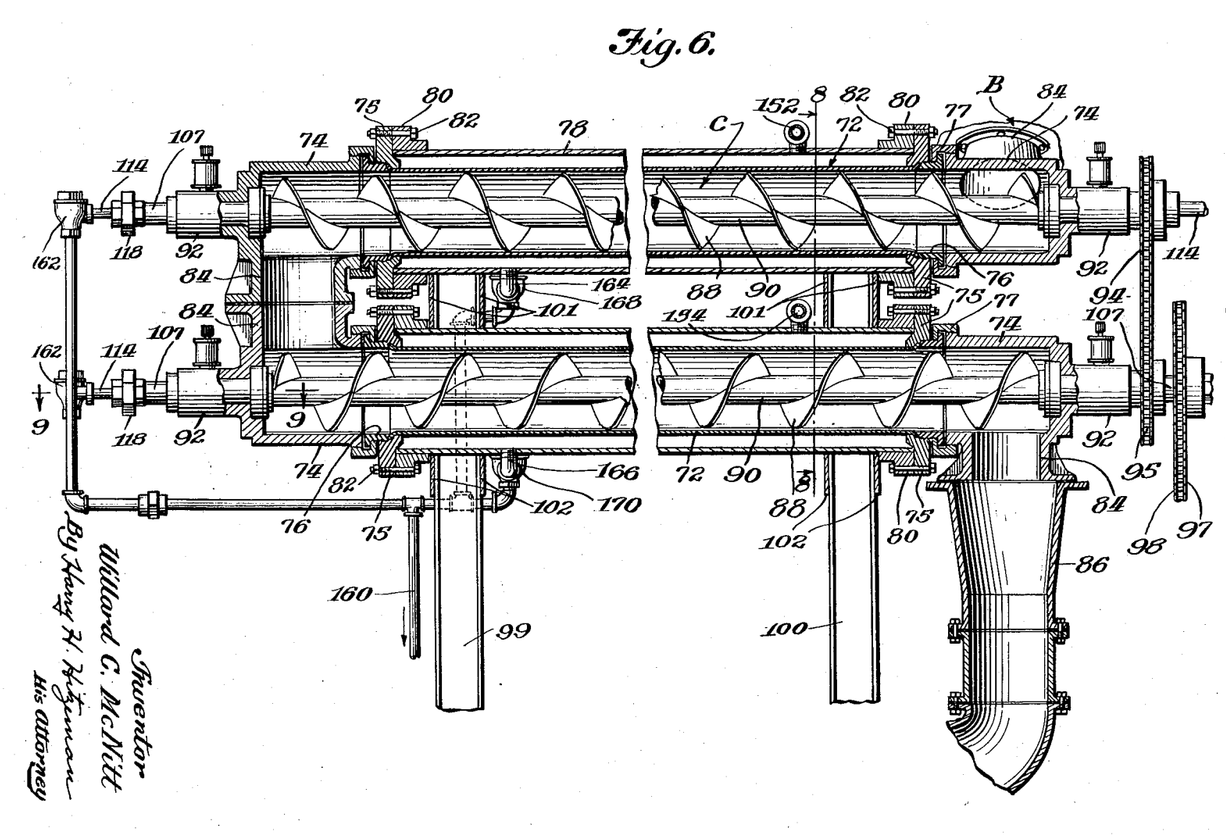
Fig. 6 is a horizontal sectional view through the heating chamber and a portion of the extractor associated therewith, and is taken generally on the line 6—6 of Fig. 5.

The heating or cooking chamber as shown in Fig. 6, comprises a pair of longitudinal conduits 72, each provided at both ends with head members 74. The head members 74 are connected to the tubular members 72 by a suitable connection comprising a collar 75, a cylindrical flanged nut member 76, and a cooperating threaded member 77. The collar 77 is formed with an interior angularly tapered bore and the end of tubular member 72 is adapted to be flanged outwardly to fit into this bore and to be securely clamped into position by the nut member 76. Suitable packing placed between the faces of nut member 76 and head member 74 provide a fluid seal at the joints.

An enveloping jacket in the form of a hollow cylinder 78 is placed around tubular member 72, providing an annular space between the members. A fastening flange 80 is provided at both ends of cylindrical member 78 and the member is suitably secured in position by bolts 82 which pass through the flanged member and through collar 75. At the left end of the heater (Fig. 6) the head members 74, which are provided with transversely extending passageways 84, are connected together by suitable flanges to form a continuous passageway from the upper chamber 72 to the lower chamber 72. Similarly, the passageway 84 of the lower right head member is positioned extending downwardly, and is secured to a suitable conduit 86 which connects with the extractor D. A spiral conveyor 88 is placed in the interior of each of the heating chambers 72. The spiral conveyor is provided with a hollow shaft 90 which extends through suitable bearings 92 from the ends of the head members 74 in a manner which will be described in more detail hereinafter.

Figures 7, 8:
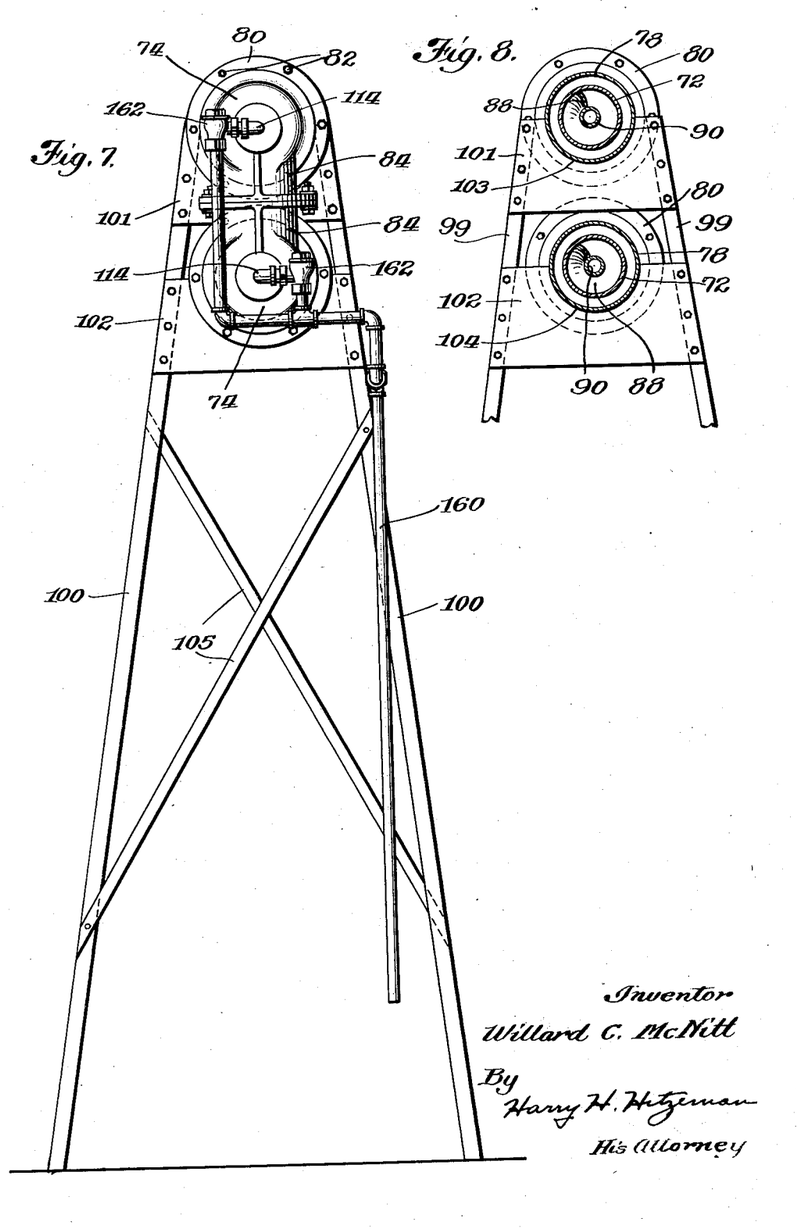
Fig. 7 is an end elevational view of the heating chambers and the end support.
Fig. 8 is a fragmentary vertical sectional view through the heating chambers and is taken on the line 8—8 of Fig. 6.

Suitable sprocket wheels 94 and 95 are secured to the shafts 92 for driving both of the spiral conveyors 88 at the same rate of speed. A driving chain 96 is geared about sprocket wheels 94 and 95. A driving sprocket 97 is fastened to the lower shaft 90 beyond sprocket wheel 95 and has a chain 98 geared thereto which extends to a driving element. The heating unit is supported upon suitable frame members 99 and 100 positioned adjacent the opposite ends thereof. This framework may be built up of a pair of channel members connected at their upper end by plates 101 and 102. These plates are formed with arcuate openings 103 and 104, within which tubular members 78 seat, thus providing a rigid and highly satisfactory support. The frame members may be further braced by diagonal bracing 105.

Referring now to Fig. 9, hollow shaft 90 of the conveyor 88 is screw-threadedly connected with a threaded end 106 of a stub shaft 107 which extends through bearing 92. The bearing is provided with a suitable bushing 108 and a packing 109 which is placed in the end of the bearing and is held in position by a collar 110 fixedly mounted on shaft 107. Shaft 107 extends beyond bearing 92 and terminates in a reduced threaded end portion 112. The reduced end is formed with a counter-bore 113 into which the end of the pipe 114 loosely fits. Pipe 114 is formed with an annular shoulder 115, and a pair of spring metal washers 116 which are clamped between lateral flanges 117 of a pair of coupling members 118 is frictionally held against shoulder 115 to produce a fluid-tight seal. A bronze bushing 119 secured in the coupling member 118 supports pipe 114 at this point.

With the above-described construction, shaft 107 may be driven and pipe 114 may be stationary. Due to the fact that live steam is forced into the interior of shaft 90 through pipe 114 and axial bore 120 in shaft 107, a fluid-tight seal must be provided, and this is accomplished by the spring washers and the annular flange 115.

While I have described only one of the above-mentioned connections, it will be understood that at each of the head members 74 a similar construction is utilized, the only difference in the construction of any one of these units being where the sprocket wheels 94 and 95 are mounted upon the stub shafts 107 beyond the bearing 92.

Referring now to Fig. 5, wherein the driving means of the entire apparatus is clearly illustrated, power is transmitted from any suitable source to a pulley 122 which is keyed to the driving shaft 123 of the extractor D. A sprocket wheel 124 has a chain 125 geared thereto which extends to a larger sprocket wheel 126 keyed to shaft 127 mounted upon suitable bearings in frame member 36. Sprocket wheel 128, mounted upon shaft 127, has a chain 129 geared thereto which extends to sprocket wheel 65 keyed to cutter shaft 64. Power for driving the conveyor 10 is likewise derived from a sprocket wheel 130 through chain 131 which is geared to sprocket wheel 132 mounted on shaft 28.

Assuming that pulley 122 is driven at a rate of approximately 180 R. P. M., by the arrangement and proportions of the sprocket wheels shown, cutter shaft 64 will be driven at approximately 180 R. P. M. and shaft 28 of the conveyor at 20 R. P. M. and the conveyor shaft 90 in the cookers at approximately 30 R. P. M.

I have found that this is a very satisfactory working speed and ratio between these different elements, although of course, these speeds may be varied as desired, depending upon the capacities of the various units and the speed with which the various operations are to be performed.

The principal element required with the construction thus far described is a supply of live steam. Accordingly a supply line 140 extends from a source of steam under pressure. To provide as much protection as possible to the various joints throughout the apparatus, steam at a very low pressure is introduced. I provide a pressure reducing valve 142 in line 140 which allows steam under 2 lbs. pressure to pass through and a safety pop-off valve 144 adapted to blow off at 2½ lbs. pressure. A gauge 146 enables the operator at all times to ascertain the pressure of the steam. Pipe-line 58 extends to and is connected with supply line 140. A valve 58a controls the admission of steam to this line. A line 148 extends downwardly from supply line 140 and connects with pipes 114 which enter the ends of shafts 107 of the conveyors 88. A valve 114a is interposed between line 148 and each of these pipes. An extension 150 extends to a pair of pipe lines 152 and 154 leading into the upper ends of tubular members 78. Suitable valves 152a and 154a are placed in these lines to control the supply thereto. A further extension pipe 156 extends from line 150 downwardly and into the shaft of the extractor unit D. A suitable valve 156a is placed in this line.

Means for permitting the condensate which collects in the shaft 90 and in the tubular members 78 are provided and comprise outlet pipes 114 at the right ends of the heating units (Fig. 6). These pipes are connected through suitable piping and fittings with a waste conduit 160. A steam trap 162 is placed in each of the lines 114. Outlet lines 164 and 166 extending from the bottoms of chambers 78 also connect through suitable fittings with the waste pipe 160. Steam traps 168 and 170 are placed in these lines. The steam traps above-mentioned are of a well-known type wherein the condensate is allowed to escape through a thermostatic valve whenever there is a sufficient supply of liquid to cool the thermostatic valve to allow the same to open. At all other times the thermostatic valve is closed, thus preserving the heating qualities of the steam until it has condensed.

The operation of the device will now be described:

Assuming that washed tomatoes are placed on conveyor 10 adjacent its lower end and elevated to the upper end of the conveyor, as the tomatoes pass steam line 58 a supply of steam will be sprayed over the tomatoes, thereby giving the whole tomatoes a preliminary heat treatment. The heating of whole tomatoes by live steam is not injurious and is a well recognized method of pre-heating whole tomatoes. The steam vapors rise in the enclosure 50, thus heating the tomatoes during the remainder of their upward journey. When the tomatoes reach the upper end of the conveyor in cutting box B they are dropped upon the revolving knives 63 which serve to cut them into equal portions as they drop through the grate 66. The tomatoes drop into the sink trap 68 and as a sufficient quantity of liquid and particles of tomatoes settle in the sink trap the entrance to conduit 71 is water-sealed by means of the liquid and the baffle-plate 70.

A continuation of the supply of tomatoes will cause the tomatoes to flow into the heating chamber C where the spiral conveyor 88 will move the material forwardly to the left end of the upper chamber 72 where the material is dropped through the head members 74 into the lower chamber 72. Due to the fact that spiral 88 and shaft 90 are integral, heat is provided throughout the entire area of the blades and the shaft. Due to the reversed direction of travel of spiral conveyor 88 in the lower chamber, the material will be moved forwardly to the right of the apparatus where it drops by gravity through conduit 86 into the extractor D.

Through the piping arrangement previously described live steam at a pressure of approximately 2 lbs. is provided within the hollow shaft 90 of the conveyors 88 and within the space between chambers 72 and cylindrical member 78, thus providing a heat treating arrangement whereby dry heat is provided for the materials, both from the internal walls and from the exterior walls. In this manner and due to the fact that the material is being moved in a forward direction in a spiral manner, the material is uniformly and evenly heated throughout. I have found by actual experiment that the material passing through the above-described cooking units reaches a temperature of over 220°.

Thus it will be seen that due to the rapid heating of the material and the fact that air is excluded from the heating chambers, a process of cooking the material has been provided whereby all of the objections of the prior art previously mentioned have been overcome.

Figure 10:
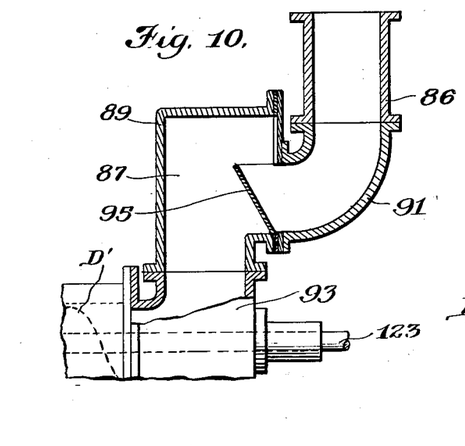
Fig. 10 is a fragmentary sectional view through the spiral conveyor in the extractor.

Referring now to Fig. 10 the conduit 86 is continued through a sink trap unit 87 into the extractor D. The sink trap may comprise a housing 89 connected with the conduit 86 by an elbow fitting 91 and to an end member 93 of the extractor. Suitable gaskets are provided at each of the joints. A baffle plate 95 is positioned at the entrance into housing 89 and is of a sufficient height so that material passing through into the extractor will flow over the baffle plate without permitting any air which may be in the extractor to pass into the heat chamber.

The extractor D may be generally similar to any of the well known types on the market except, however, having a spiral extracting medium D' which is driven by the drive shaft 123. In this instance, however, I prefer to use a hollow extracting medium D' so that steam may enter the unit though pipe 156 as shown on the drawings.

The purpose of this construction is to assist in maintaining the high temperature of the material which passes through conduit 86 into the extractor. This provides a continuous heating of the material from the time it arrives in the cooker until it is expelled from the extractor into the containers which are then sealed without any further heating or pasteurizing and the product is ready for the market.

From the above description it can be readily seen that with my improved process all of the desired results which I have enumerated are accomplished. The tomatoes have been cut and immediately passed into air excluded heating chambers where they are cooked at a temperature of over 180 degrees and after this cooling they are passed into the extractor without becoming exposed to air.

As a modification, in Fig. 3 I have shown an additional steam inlet 62a through which live steam may be poured upon the cut-up materials as they descend into the trap. The purpose of the provision of this additional steam source in some instances is to provide additional heating means in the cutting box for the materials and to exclude from the cutting chamber any possible air which might otherwise be present. This additional steam source may be utilized very effectively in some modified machines wherein it is desired to maintain a more intense heat upon the materials.

While I have illustrated and described a specific embodiment of my invention and some of the details thereof in a specific mechanism I desire it to be specifically understood that I do not wish to be limited to the exact details shown, rather what I desire to secure and protect by Letters Patent of the U. S. is:

1. The process of non-aerating cooking of tomatoes whereby vitamin C, and other vitamins, the vapors, fumes and flavor, will be retained in the juice, comprising the steps of pre-heating the whole tomatoes while being conveyed to a cutter, cutting the tomatoes into uniform particles, dropping the particles through a water trap into an air-excluded chamber, cooking the particles in the chamber at a temperature of not less than 150°, expelling the cooked tomatoes through a water trap into a heated extractor, and removing the juice at substantially a temperature of 150° F. or more.

2. Apparatus of the class described, comprising in combination an elevating and conveying mechanism, means for introducing heat to material carried by said conveyor, a cutting box associated with the upper end of said conveying mechanism, cutting means mounted in said box, a cooking chamber connected to the bottom of said box, a conduit from said box into said chamber, a water trap adjacent the entrance of said conduit, means for heating said cooking chamber by conducted dry heat, and a water trap adjacent the exit from said chamber.

3. Apparatus of the class described, comprising in combination an elevating and conveying mechanism, means for spraying live steam upon material carried by said conveyor, a cutting box associated with the upper end of said conveying mechanism, cutting means mounted in said box, a cooking chamber connected to the bottom of said box, a conduit from said box into said chamber, a water trap adjacent the entrance of said conduit, means for heating said cooking chamber by conducted dry heat, and a water trap adjacent the exit from said chamber.

4. Apparatus of the class described, comprising in combination an elevating and conveying mechanism, means for introducing heat to material carried by said conveyor, a cutting box associated with the upper end of said conveying mechanism, means for guiding the exhaust steam in said conveyor to the cutting box, cutting means mounted in said box, a cooking chamber connected to the bottom of said box, a conduit from said box into said chamber, a water trap adjacent the entrance of said conduit, means for heating said cooking chamber by conducted dry heat, and a water trap adjacent the exit from said chamber.

5. Apparatus of the class described, comprising in combination an elevating and conveying mechanism, means for introducing heat to material carried by said conveyor, a cutting box associated with the upper end of said conveying mechanism, cutting means mounted in said box, a cooking chamber connected to the bottom of said box, a conduit from said box into said chamber, a spiral conveyor mounted in said chamber for moving and agitating the material, a water trap adjacent the entrance of said conduit, means for heating said cooking chamber by conducted dry heat, and a water trap adjacent the exit from said chamber.

6. Apparatus of the class described, comprising in combination an elevating and conveying mechanism, means for introducing heat to material carried by said conveyor, a cutting box associated with the upper end of said conveying mechanism, cutting means mounted in said box, a cooking chamber connected to the bottom of said box, a conduit from said box into said chamber, means for applying heat to materials in said chamber through internal and external walls thereof, a water trap adjacent the entrance of said conduit, means for heating said cooking chamber by conducted dry heat, and a water trap adjacent the exit from said chamber.

7. Apparatus of the class described, comprising in combination an elevating and conveying mechanism, means for introducing heat to material carried by said conveyor, an enclosure over said conveyor for directing the heat introduced upwardly, a cutting box associated with the upper end of said conveying mechanism, cutting means mounted in said box, a cooking chamber connected to the bottom of said box, a conduit from said box into said chamber, means for applying heat to materials in said chamber through internal and external walls thereof, a water trap adjacent the entrance of said conduit, means for heating said cooking chamber by conducted dry heat, and a water trap adjacent the exit from said chamber.

WILLARD C. McNITT.